Patented Nov. 3, 1953

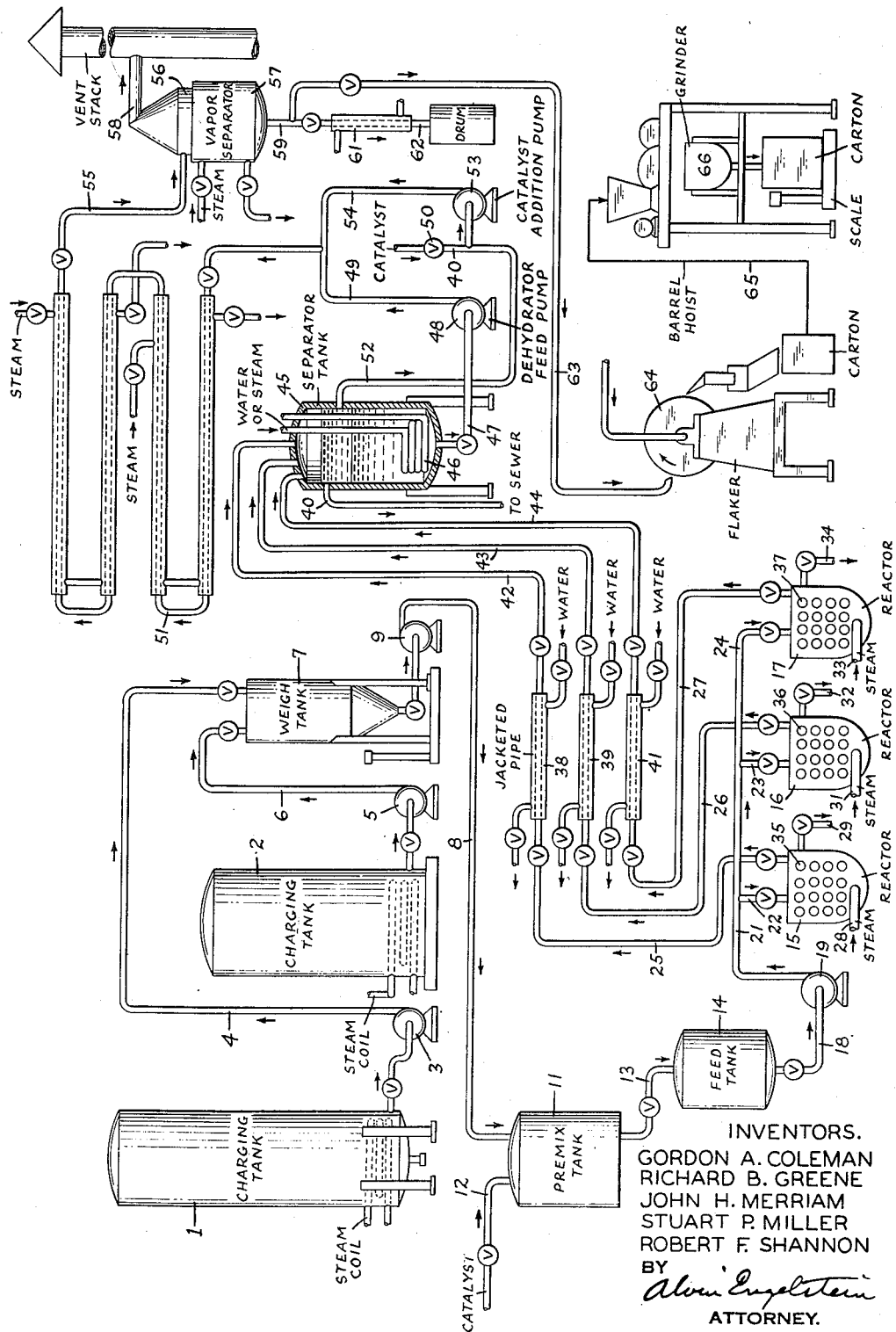

2,658,054

UNITED STATES PATENT OFFICE 2,658,054

CONTINUOUS RESIN PROCESS

Gordon A. Coleman, Wyndmoor, and Richard B. Greene and John H. Merriam, Philadelphia, Pa., Stuart P. Miller, Scarsdale, N. Y., and Robert F. Shannon, Conneaut Lake, Pa., assignors to Allied Chemical & Dye Corporation, New York, N. Y., a corporation of New York Application October 31, 1951, Serial No. 254,016

10 Claims. (Cl. 260—57)

This invention relates to the production of resins and more particularly refers to a new and improved continuous process for the manufacture of condensation products for use as molding compositions, laminates, adhesives, surface coating materials and the like.

The commercial use of synthetic resinous materials had its beginning about one-half century ago and during the subsequent years has attained an ever increasing importance with present annual production of hundreds of millions of pounds of resin. It is most significant that despite advanced knowledge in the art virtually all, if not all, commercial manufacture of resins is accomplished by the inefficient "batch" operation, i. e. heating a fixed volume in a large kettle, rather than a modern, economical method of continuously subjecting a flowing stream of charging materials under conditions to effect the desired condensation and continuously withdrawing the resinous product. In explanation for failure of industry to convert their manufacturing facilities to continuous operation, the condensation reaction influenced by the nature, proportion of reactants and catalyst, time and temperature is a progressive reaction passing through various stages of molecular rearrangement which unless halted at the proper moment results in an undesired product. Relatively small changes in time and temperature exert a profound effect on the condensation reaction particularly in continuous operation, where for example an increase in temperature may expand or vaporize the flowing stream of material undergoing treatment with a consequent reduction in residence time not necessarily in proportion to the effect of increased temperature thereby usually requiring extended manipulation of the operating conditions including change in feed rate until equilibrium conditions are once again obtained. In continuous operation as attempted by prior investigators an excessive insulating, clogging film of resin deposits on the inner wall of the heating unit impeding heat transfer therethrough necessitating the employment of cumbersome scrapers and frequent adjustments of the heating medium to maintain the reaction mass at a fairly constant temperature. Continuous operation is also hampered by lack of flexibility; changes in the conditions of operation for the production of a different resinous product being impractical. In contrast, despite the limitation of efficiency inherent in a batch process, variations in volume of reaction mass in a batch vessel due to expansion has no appreciable effect on time and temperature since the mass is static, that is, confined. A large fixed body of liquid material may be more closely regulated with respect to temperature and time and will not be subject to as wide a fluctuation in these factors as a small stream of flowing material in the continuous process. Since in batch operation each unit volume of material is separately treated no added burden is imposed by changing operating conditions to produce a different product whereas in continuous operation a transition from one state of conditions to another requires time consuming efforts with consequent spoilage of valuable materials. Resin formation processes both in batch and previously suggested continuous types involving the presence of water are further complicated by the necessity of dehydrating the reaction mass thereby imposing additional time-temperature conditions on the mass causing further difficulties in controlling the quality of the final product.

One object of the present invention is to provide an efficient, continuous process for converting condensation reactants into resinous materials of uniform desired quality.

Another object of this invention is to provide an improved process of regulating reaction conditions in a process for converting condensation reactants into synthetic resins.

A further object of the invention is to provide a flexible, continuous process for producing resinous products of different qualities without interrupting the continuity of operation.

Another object of the present invention is to provide an efficient, unitary, continuous process for the production and dehydration of condensation reaction products.

A further object of the invention is to provide an improved method of dehydration in a process for converting condensation reactants containing water into synthetic resins.

Further objects and advantages will be apparent from the description and accompanying drawing.

We have found that when condensation reactants are incompletely condensed in the presence of a catalyst in a first stage and condensation carried to substantial completion in the presence of smaller regulated amounts of catalyst in a second stage, the condensation reaction can be controlled within narrow limits to obtain the desired resinous product. Further, by cooling the effluent from the first stage and separating and removing a portion of the water and catalyst therefrom, the load on the second unit is reduced and dehydration of the reaction mass may be accomplished at temperatures and pressures higher than otherwise possible.

A preferred method of carrying out the process of the present invention involves continuously passing a stream of resin forming reactants through an elongated coil of restricted cross-sectional area wherein the reactants are subjected to an elevated temperature for a sufficient length of time to effect substantial condensation, interrupting the condensation reaction before completion of the desired reaction by cooling and discharging the effluent from the coil into a separator wherein the effluent is maintained at a sufficiently low temperature to effect separation into an upper layer of aqueous liquid containing residual catalyst and lower layer of incompletely converted resinous material, discharging a portion of the aqueous liquid containing residual catalyst from the system, passing the incompletely converted resinous material through a second heating coil wherein the incompletely converted resinous material is elevated to a temperature sufficiently high at the coil discharge end to effect vaporization of water in the reaction mass and wherein the condensation reaction is carried to the desired degree of completion, regulating the extent of the condensation reaction in the second coil by the introduction of controlled amounts of aqueous liquid containing residual catalyst into the incompletely converted resinous material undergoing further conversion in the second heating coil, passing the effluent of vapor and liquid from the second coil into an enlarged vessel maintained under substantially isothermal conditions wherein vapor is separated and removed from the resinous product and discharging the resinous product from the enlarged vessel at a rate sufficient to prevent any substantial accumulation of liquid therein thereby minimizing further reaction of the resinous product.

The accompanying drawing is a diagrammatic flow sheet illustrating the process of the present invention.

The process of the present invention is employed in the treatment of charging materials which resinify in the presence of a catalyst upon the application of heat, which charging stocks are well known and usually classified in the art by the type resin to be produced such as phenoplasts involving the reaction between phenols and aldehydes; urea plastics involving the reaction between ureas and aldehydes; and melamines involving the reaction between melamine and formaldehyde and alcohols. Various catalysts are listed in the literature for use in resinification and are commonly divided as acidic catalysts and basic catalysts. Most of the condensation reactions occur in the presence of water as a result of splitting off of water during the reaction and the introduction of water with the charging materials in the form of aqueous solutions.

Our invention is particularly applicable to the processing of phenol-aldehyde for the production of phenoplasts which condensation reaction is sensitive to small changes in time-temperature as well as and generally to a lesser extent to the influence of the catalyst for promoting the reaction. The present invention is especially concerned with the manufacture of molding resins of the tar acid-formaldehyde type but applies also to laminating varnishes, bonding resins and the like. Tar acids as commonly used in the industry may be phenol, cresols, xylenols and mixtures thereof. Formalin commonly used in the industry is about a 37% solution of formaldehyde in water. In some instances it may be desirable to substitute paraformaldehyde, alcohol solutions of formaldehyde or the like for formalin.

In the drawing charging tanks 1 and 2 represent a plurality of storage tanks, provided with conventional steam coils to impart a slight degree of preheat to the contents containing the monomeric materials to be converted into resinous products. For illustrative purposes charging tank 1 may be filled with phenol and charging tank 2 with a 37% aqueous formaldehyde solution. Accurately measured quantities of the reactants are obtained by discharging phenol by means of pump 3 and line 4 and formaldehyde by means of pump 5 and line 6 into weighing tank 7 from whence the mixture is forced by pump 9 through line 8 into elevated premixing tank 11 into which small quantities of the desired amount of catalyst are introduced through line 12. The combined mixture of phenol, formaldehyde and catalyst flows preferably by gravity through line 13 into feed tank 14 which is the final source of supply of the reactants in the correct proportion for the process wherein it is held in storage under regulated temperature.

A typical feed to produce molding resin consists of a mixture in the proportion of six mols of phenol, five mols of formalin (37% water solution of formaldehyde), and a catalyst of 0.5% sulfuric acid by weight of the phenol.

A multiplicity of heating units designated in the drawing as numbers 15, 16 and 17 connected in parallel with provision for cutting out one or more heating units depending upon the desired throughput of the plant receives the mixture of reactants from feed tank 14 through line 18, pump 19, lines 21, 22, 23, 24 and discharges from heating coils 15, 16 and 17 through respective lines 25, 26 and 27. Reactors 15, 16 and 17 may be any suitable unit adapted to heat a confined flowing stream of fluid through an elongated passage of restricted cross-sectional area. One form of reactor consists of an enclosed metal shell in the shape of a water trough containing a plurality of pipes connected together to form a continuous passage and means for indirectly heating the fluid flowing through the pipes by the introduction of a heating medium, for example steam, into the space between the outside of the heating pipes and the inner wall of the shell. The inlets and outlets of the heating medium are respective lines 28, 29; 31, 32; 33, 34 for reactors 15, 16 and 17, respectively. Although the diameter and the length of tubes 35, 36 and 37 may be varied it will be found that tubing of from about ½ inch to 2 inches inside diameter with a total length of 400 to 1,200 feet will be satisfactory for most commercial operations. Temperature and time of reactants within coils 35, 36 and 37 will depend upon the nature of the materials undergoing condensation and the degree of reaction desired; for example, a reaction time of about 200 minutes at 60° C. would compare with a residence time of 2 minutes at 175° C., with the same amount of catalyst. While time and temperature are to a large extent interchangeable factors, the time-temperature correlation should be such that resinification should be incomplete in reactors 15, 16 and 17, but desirably a predominant part of the reaction should occur in these reactors, preferably from 50 to 90% of the condensation reaction should take place in this first stage heating. By carrying the reaction short of completion within the heating coils in the reactors, completion of the reaction may be accomplished in another stage more susceptible to control and, furthermore, minimizes the formation of a viscous product on the wall of the coil with possible plugging up of the coil. In order to avoid the formation of a thick insulating film of resinous material on the interior of the heating coils with consequent impaired heat transfer through the tube walls it is advisible to maintain a sufficient linear velocity through the coils adequate to prevent local overheating. In practice we have operated satisfactorily with linear velocities of 0.25–1.0 foot per second.

With a given minimum amount of catalyst, we have found that the correlation of time and temperature to effect an incomplete reaction combined with high velocities in the coil makes it unnecessary to employ agitating or scraping devices in reactors 15, 16 and 17. If the reactants are of a volatile nature and high temperatures are maintained in the reactors then superatmospheric pressure on the coils in the reactors should be maintained to prevent vaporization. In most instances slight superatmospheric pressure of the order of 25 pounds' gauge will suffice.

One of the advantages of the present invention is that it permits precise control of the reaction conditions on the materials undergoing treatment. In addition the initial reactors need not be rigidly regulated since variations occurring in this first stage can be compensated for in a subsequent later stage under specially controlled conditions disclosed herein to produce the exact product desired.

Partially converted resinous material from reactors 15, 16 and 17 discharge through respective lines 25, 26 and 27 into coolers 38, 39 and 41 of any suitable conventional construction wherein the effluent from the reactors are cooled by indirect heat exchange with water passing through jacketed pipes to a temperature sufficiently low to arrest further substantial reaction, preferably below 50° C. The cooled reaction mass passes through lines 42, 43 and 44 into separator tank 45 provided with heating or cooling coil 46 into which cooling water or steam may be introduced. The temperature in separator tank 45 should desirably be low enough to cause the reaction mass to separate into an upper aqueous layer containing residual catalyst and a lower layer constituting the resinous mass and to arrest substantial further reaction of the resinous material therein and high enough to maintain the resinous lower layer in a relatively non-viscous state, i. e. a condition of sufficient fluidity to facilitate pumping of the liquid resinous material. Ordinarily temperatures between 60° C. and 25° C. will be found satisfactory for effectuating separation of the reaction products into two layers, slowing down the reaction and maintaining the resinous material in a relatively non-viscous fluid state. A portion of the upper layer in separator tank 45 is drawn off through line 40 and discarded. The reaction mass is thereby relieved of water, reducing the heating load on the second stage heating coil and facilitating dehydration of the resinous product. Also the removal of promoting catalyst discarded with a portion of the upper aqueous layer from the incompletely converted reaction mass prior to further heating permits the reaction to proceed at a lower rate in the second heating coil which is less sensitive to time-temperature fluctuations.

When operating to produce resins, employing about a 6:5 molal ratio of phenol to formaldehyde feed with an $H_2SO_4$ catalyst concentration of from 0.2 to 0.6% by weight of phenol, and subjecting the feed in heating coil 35 to a residence time of 12–25 minutes at a temperature of about 100° C., the reaction products entering separator tank 45 will divide into an upper water layer constituting about 20 to 40% of the total mass containing from 0.3 to 1.4% $H_2SO_4$ and from 2 to 6% formaldehyde, and a lower resinous layer containing less than 0.5% $H_2SO_4$, less than 1% formaldehyde, from about 3 to 6.5% phenol, and from about 10 to 20% water. The formaldehyde content of the water layer is a rough measure of extent of reaction and can be varied by increasing or decreasing feed rate which assuming constant vaporization in the heating coils 35, 36, 37 is inversely proportional to residence time. More fluid, lower melting point resins may be produced by controlling formaldehyde content of water layer within range of 4.5 to 5.5%. Comparatively viscous high melting point resins may be produced by controlling formaldehyde content of water layer within the range of 2.5 to 3.5%. The resins from these tubes may be directly cooled and held in storage for reasonable periods of time at about room temperature.

The lower layer of incompletely converted resinous material withdrawn from the bottom of separator tank 45 through line 47 is forced by pump 48 through line 49 into a steam jacketed coil 51 about 200 to 400 feet long and about 1–2 inches in diameter wherein the resinous material is elevated to a temperature of about 135 to 175° C. under slight superatmospheric pressure of approximately 15 to 30 pounds' gauge pressure. The second heating coil 51 has the functions of completing the resinification reaction and elevating the temperature of the material to effect ready separation of the moisture therefrom.

Feed to tube 51 is maintained at a rate sufficient to keep the internal surface of the tube from becoming excessively fouled. It has been found in practice, that a feed rate of 17.5 pounds per minute through a 2″ IPS (iron pipe size) tube is adequate when the feed consists of a mixture of one-third the water layer separated, plus resin layer which has been reacted to the extent formaldehyde content of the water layer was 4.0%. Velocity of feed during its course through tube 51 becomes increasingly higher due to the volatilization of the water. At and near tube outlet 51 where the resinous mass therein has a greater tendency to foul the tube, the velocity of the feed due to vaporization of the volatile constitutents is at about its maximum thereby aiding in prevent impairment of heat transfer and plugging up of the tube. Tube 51 should be of a length to provide heat transfer area required to dehydrate the resin passing through the tube at a velocity rate sufficient to prevent excessive fouling. A 2″ IPS tube 400 feet long jacketed for 235 p. s. i. g. steam has sufficient capacity to dehydrate up to 16 pounds of resin layer, plus 1.5 pounds of water layer per minute. Water and free phenol content of final products are controlled by regulating the steam pressure on the jacket around dehydrator tube 51. The melting point of the resin product is influenced by degree of completion of reaction of feed in resinifier coils 35, 36 and 37, as well as temperature and percentage of condensing agent present during residence in coil 51.

An important feature of the present invention resides in controlling the condensation reaction in heating coil 51 to the desired end point by directing a portion of the upper aqueous layer containing residual catalyst in tank 45 in regulated amounts through line 52, pump 53, line 54 into the flowing stream of resinous material entering heating coil 51. Catalyst from an external source may be introduced through line 40 and valve 50. We have found that the introduction of controlled amounts of catalyst into the stream of resinous material undergoing completion of reaction is a far simpler, more accurate method of regulating the degree of condensation than was possible by varying temperature, time, feed rate or any combination of these three factors. Furthermore, we have found that the condensation reaction to produce products of different degrees of condensation without breaking the continuity of operation may be quickly and accurately attained merely by changing the rate of catalyst introduced into the stream of resinous material undergoing condensation in the second heating coil 51. Indeed equilibrium conditions in the entire operation are rapidly achieved and adjustments readily made due to fluctuations of operating conditions inherent in the operation by means of introducing regulated amounts of catalyst into the second heating coil wherein the reaction is brought just to completion and where the closest control is needed. Needless to say, adjustments in time, temperature, catalyst and feed rate may be made in the practice of our invention but fine regulation of the reaction to the desired end point is obtained by controlling the quantity of catalyst entering the second heating coil.

In the course of our experiments, we have found that the cure time of the dehydrated resin can be controlled without appreciably affecting the melting point by adding water layer containing residual catalyst separating in tank 45 to the resin layer entering as feed to coil 51. There is an unexpected shortening of the cure time of the resin obtained by admixing water layer with the resin undergoing dehydration. Illustrative of the effect of water layer addition to resin layer prior to passage through coil 51 and vapor separator 56 are comparative properties of resultant resins when admixing zero amount of water layer to the resin, 13% water layer, and 18% water layer.

| Percent by weight water layer added to resin prior to dehydration | Dehydrated resin | |
|---|---|---|
| | Melting point, °C. | Cure at 160° C., seconds |
| 0 | 98 | 38 |
| 13 | 98 | 31 |
| 18 | 95 | 29 |

The temperature of the reaction mass at the outlet of heating coil 51 should desirably be sufficiently high so that when discharged through line 55 separation of water and other unwanted volatile constituents such as unreacted formaldehyde and phenol will take place in vapor separator 56 maintained under substantially isothermal conditions. Thus, heating in coil 51 accomplishes the dual purpose of completing the reaction and furnishing heat for dehydrating the reaction products.

It will be found advantageous to have all the volatile constituents proposed to be removed from the reaction mass in coil form at coil outlet 51. This may be accomplished by using low pressure at that point of the order of atmospheric or slight superatmospheric pressure depending upon the nature and percent low boiling material in the mass. Vapor and liquid issuing at high velocity from coil 51 into vapor separator 56 will then separate without the requirement of additional heat other than that provided by a steam jacket 57 around vapor separator 56 to compensate for radiation in order to prevent condensation of the water vapor or too rapid cooling of the liquid resinous material. In this manner resinous material may be continuously dehydrated in a relatively small chamber substantially without the application of additional heat to further vaporization or without congealing the resin due to cooling by evaporation. A pressure differential may in some instances be maintained on coil outlet 51 and chamber 56 to effect flash vaporization of the reaction products therein; however care must be taken that the loss of heat in vessel 56 due to the latent heat of vaporization should not drop the temperature of the contents to a point where the resin becomes too viscous.

Although a vacuum may be connected to the top of vapor separator 56 through conduit 58, offset to prevent condensate from flowing back to the separator, through which the vapors pass, we prefer to effect separation of vapor and liquid therein at substantially atmospheric pressure thereby eliminating the need for a condenser, receiver, vacuum pump, condensate pump, etc. and all necessary utilities and maintenance required to operate this equipment. Another advantage in effecting separation of vapor from liquid resin at atmospheric pressure results in greater removal of phenol from the resin, caused by the increased volatility of phenol relative to that of water at high temperatures. A low phenol contents in the final resinous product is desirable to reduce sintering of the resin.

As previously stated one of the difficulties in the prior art was to dehydrate the reaction mass without further reaction. Resort was had to costly vacuum distillation enabling removal of water from the resin at lower temperatures. However, the use of vacuum was only partially effective in stopping further reaction of the resin and due to the lower temperature resulted in a more viscous product which could not be as easily handled.

We have discovered that dehydration of the reaction mass at high temperatures to enable the resin to remain in a non-viscous state and without any appreciable further reaction of the resin may be accomplished by discharging the resin from vapor separator 56 at a rate sufficient to prevent any substantial accumulation of liquid therein, i. e. just enough liquid to make a liquid seal at the discharge of vessel will suffice. Thus by reducing the time element to a negligible value during the separation of vapors from liquid further reaction of the resin is practically eliminated without the use of vacuum and without dropping the temperature to a point where the resin becomes viscous.

As is apparent from the foregoing our continuous method of dehydration and its attendant advantages may be utilized to dehydrate resins from sources other than those resulting from the continuous resinification specifically illustrated herein.

The following tabulation of rata (a), (b) and (c) show the effect of operating variables, that is, change in catalyst concentration, residence time, and formaldehyde content of water layer.

(a) *Effect of catalyst concentration on formaldehyde content of $H_2O$ layer*

[Temperature of resinfication, 100° C., 6:5 molal ratio of phenol to $CH_2O$ feed.]

| Residence time, minutes | Catalyst, Percent $H_2SO_4$ on phenol | Percent $CH_2O$ in $H_2O$ layer |
|---|---|---|
| 13.5 | 0.4 | 4.55 |
| 14.0 | 0.45 | 4.40 |
| 13.5 | 0.50 | 4.17 |
| 13.5 | 0.60 | 3.80 |

(b) Effect of residence time on formaldehyde content of H₂O layer

[Temperature of resinification 100° C., 6:5 molal ratio of phenol to CH₂O feed.]

| Residence time, minutes | Catalyst, percent $H_2SO_4$ on phenol | Percent $CH_2O$ in $H_2O$ layer |
|---|---|---|
| 12.5 | 0.60 | 3.74 |
| 13.5 | 0.60 | 3.65 |
| 15.0 | 0.60 | 3.59 |
| 17.0 | 0.60 | 3.34 |
| 18.2 | 0.60 | 2.82 |
| 18.7 | 0.60 | 2.54 |

(c) Effect of formaldehyde content of water layer on melting point and viscosity of resin—relatively constant dehydration conditions

| Percent $CH_2O$ in $H_2O$ layer | Melting point, ° C. | Viscosity, cps. 150° C. |
|---|---|---|
| 2.25 | 105 | 4,250 |
| 2.67 | 100 | 2,900 |
| 2.87 | 95 | 1,400 |
| 3.60 | 92 | 1,200 |

Although the continuous resinification process has been described with particular reference to production of resins which separate into a water layer and a resinous layer after heat treatment in continuous coils 35, 36 and 37, the present invention is also applicable to the manufacture of water-soluble resins which are completely miscible with water and will not form layers in separator tank 45.

In the production of water-soluble resins the reactants in feed tank 14 are generally phenol with a molal excess of 37% formalin together with about 0.5 to 2.0% (dry basis, based on weight of phenol) of an alkali catalyst such as sodium hydroxide or potassium hydroxide. The feed is then forced by pump 19 through coils 35, 36 and 37 wherein it is heated to a temperature desirably below 100° C., preferably between 80–90° C., for a sufficient length of time, about 30 to 60 minutes' residence time, to produce a coil effluent containing about 5% free formaldehyde. Since there will be no separation of a water layer from the reaction products, it will be unnecessary to abstract heat by means of coolers 38, 39 and 41 as the resinous mass flows through lines 25, 26 and 27 into tank 45 which acts as a surge tank. Unseparated reaction products in a heated condition are withdrawn from the bottom of tank 45 through line 47 and forced by pump 48 through dehydrator coil 51 wherein the products are heated to a temperature of about 100–115° C. at the coil outlet under a pressure of a few pounds gauge. Vapor, primarily water vapor, and liquid discharging from line 55 enters vapor separator 56 maintained at substantially atmospheric pressure wherein the vapors are released through outlet 58 and vent stack to the atmosphere and the dehydrated resin withdrawn from the bottom through line 59.

A typical feed to the process for conversion into varnish resins would consist of tar acid, mixtures of cresols, phenol and xylenols, and formaldehyde in about equimolar portions together with 1–1.5% NH₃ catalyst, dry basis by weight of tar acids. Other suitable catalysts such as the fixed alkalies, hexamethylenetetramine or other amines, may also be employed but in adjusted proportions which are well established in the art. It will be recognized that in the production of varnish and bonding resins, or the like, there can be considerable variations in the tar acid: formaldehyde molar ratio, depending upon ultimate application.

The dehydrated resinous material may be discharged through line 59, cooled in cooler 61 and sent to storage through line 62 or if a flake product is desired it may be directed through line 63 to flaker 64 from whence it is discharged to storage or if desired comminuted by sending it through line 65 to conventional grinder 66 and finally to storage.

In order to ensure the continuity of operation, stand-by equipment such as duplicate pumps, chambers, coils, by-pass lines may be employed in the event of breakage or impairment of the apparatus as is conventional in industry.

Examples for practicing the process in accordance with the present invention are as follows:

EXAMPLE 1

The charging material to the process is composed of a mixture having the following composition:

| | Pounds per hour |
|---|---|
| Phenol | 1,180 |
| 37% formaldehyde | 850 |
| 20% $H_2SO_4$ | 30 |
| Total | 2,060 |

Feed stock is continuously pumped at a pressure of 25 pounds' gauge through an elongated coil composed of stainless steel tubing of one inch outside diameter, 16 gauge thick and 960 feet long surrounded by a steel casing and heated by steam or other mediums passing between the outside wall of the tubing and the inside of the shell. Reaction products leaving the tubular coil at a temperature of 100° C. are immediately cooled to a temperature of 50° C. by passing water through a jacketed pipe surrounding the transfer line from the heating coil. The cooled effluent enters an enclosed separator tank about 3,000 gallons capacity equipped with a cooling coil to maintain the temperature of the contents at 50° C. In the separator tank the reaction products divide into two layers having the following compositions:

| | Upper aqueous layer, pounds per hour | Lower resinous layer, pounds per hour |
|---|---|---|
| Water | 500 | 205 |
| Formaldehyde | 22 | 13 |
| Phenol | 15 | 75 |
| $H_2SO_4$ | 4 | 2 |
| Resin | 10 | 1,214 |
| Total | 551 | 1,509 |

267 pounds, or approximately ⅔ of the upper aqueous layer are sent as waste to the sewer. The lower layer of resinous material at the rate of 1,509 pounds per hour is then pumped through a second heating coil composed of one-inch stainless steel pipe 300 feet long surrounded by a steel pipe jacket through which steam at 190 pounds' pressure flows countercurrent to the stream of resinous material. The remainder of the upper aqueous layer from the separator tank, approximately ⅓, is commingled with the lower resinous layer prior to introduction into the second heating coil. During the operation the amount of aqueous upper layer containing residual catalyst introduced into resinous material undergoing treatment in the second heating coil is varied, that is if the condensation reaction is not substantially completed by the time the reaction products left the second heating coil a greater amount of aqueous liquid is fed or conversely if the condensation reaction has progressed to a state beyond that desired a smaller amount of aqueous liquid containing residual catalyst is fed. Thus by the use of one simple, readily controllable variable, accurate termination of the reaction is quickly and easily made. The resinous materials together with a portion of the aqueous upper layer enter the second heating coil at a pressure of 40 pounds' gauge and discharge from the coil at a temperature of 165° C. and about 15 pounds' gauge pressure. The reaction mass at the outlet of the second heating coil is composed of a frothy mixture of liquid and vapor which upon discharge into a vapor separator, approximately 2 feet in diameter and 4 feet high settles into a lower layer of dehydrated resinous material above which separated vapors and gases are released from the top of the vapor separator open to the atmosphere. The vented vapors and gases have the following composition:

|   | Pounds per hour |
|---|---|
| Water | 373 |
| Formaldehyde | 20 |
| Phenol | 50 |

In order to minimize radiation losses the vapor separator is surrounded with steam jacket into which steam at about 50 pounds' gauge is introduced. The dehydrated resinous material with just enough resin in the vapor separator to form a liquid seal thereby preventing any substantial accumulation of resin and further reaction therein is continuously withdrawn and flaked by flowing the resin on a water cooled cylinder and scraping the film of solid resin from the cylinder. The final resin product has the following composition:

|   | Pounds per hour |
|---|---|
| Phenol | 30 |
| $H_2SO_4$ | 3 |
| Resin | 1,217 |
| Total | 1,250 |

Other examples of carrying out continuous resinification and dehydration with and without the addition of water layer are summarized in the following tabulation of data.

| Conditions | Example No. | | | | | |
|---|---|---|---|---|---|---|
|  | 2 | 3 | 4 | 5 | 6 | 7 |
| Feed: | | | | | | |
| Phenol to formaldehyde molal ratio | 6/5 | 6/5 | 6/5 | 6/5 | 6/5 | 6/5 |
| Catalyst concentration, percent | 0.4 | 0.4 | 0.5 | 0.5 | 0.6 | 0.6 |
| Resinifier temperature, °C | 100 | 100 | 100 | 100 | 100 | 100 |
| Resinifier residence time, min | 12.5 | 12.5 | 16 | 16 | 20 | 20 |
| Formaldehyde in water layer, percent | 4.5 | 4.5 | 3.5 | 3.5 | 2.5 | 2.5 |
| Dehydrator feed: | | | | | | |
| Resin layer, lb./min | 20 | 16 | 20 | 16 | 20 | 16 |
| Water layer, lb./min | 0 | 1.5 | 0 | 1.5 | 0 | 1.5 |
| Temperature, dehydrator coil exit, °C | 165 | 170 | 167 | 172 | 170 | 175 |
| Properties of resin: | | | | | | |
| Melting point, °C | 87 | 92 | 95 | 98 | 100 | 103 |
| Viscosity at 150° C., cps | 800 | 1,200 | 1,400 | 1,900 | 3,000 | 3,900 |
| Cure at 160° C., secs | 45 | 30 | 39 | 27 | 36 | 22 |
| Free phenol, percent | 3.8 | 3.3 | 3.3 | 2.9 | 2.9 | 2.4 |
| Water (Karl Fisher), percent | 0.8 | 0.8 | 0.8 | 0.7 | 0.7 | 0.7 |

EXAMPLE 8

A feed mixture in the proportion of synthetic phenol (1 mole), 37% formalin (1.74 moles), and 0.85% dry basis, by weight of phenol, catalyst (50% sodium hydroxide solution) is continuously passed through a coil immersed in a bath of water at 91° C. wherein it is heated for a residence time of 40 minutes. The coil effluent has the following properties: free formaldehyde—4.6%; pH—8.0; dilutability with water—infinite.

The coil effluent which is infinitely soluble in water and does not separate into layers is then continuously pumped through a dehydration coil externally heated by steam wherein the resinous mass is heated to a coil outlet temperature and pressure of 106° C. and 6 p. s. i. g. The products from the dehydration coil are passed into a vapor separating tank maintained at atmospheric pressure and jacketed to compensate for radiation heat losses. Water vapor from the tank is vented to the atmosphere and the resin is continuously withdrawn from the separating tank. The resin product has a free formaldehyde content of 4.5% and a water-dilutability ratio of 1:10.

EXAMPLE 9

The charging stock consists of a mixture in the following proportions:

| | |
|---|---|
| Resin cresol (50% meta-para-cresol and equal parts phenol, o-cresol and xylenols) _mole_ | 1 |
| Paraformaldehyde of 93% $CH_2O$ content _mole_ | 1 |
| $NH_3$ (dry basis, based on tar acid) _percent_ | 1.5 |

The premixed charge is continuously passed through a coil wherein it is heated for a residence time of 46 minutes to a temperature of 100° C. The amount of water present after resinification, arising from the water content of the formaldehyde and from the condensation reaction is higher than permissible in most types of varnish resins.

The reaction products from the coil are passed into a tank and thence continuously passed through a second heated tube wherein it is heated for a residence time of about 1 minute to 70° C. and then introduced into a vapor separator maintained under 29.5" vacuum to effect removal of water equivalent to about 5% of the tube effluent. The dehydrated resin product is of sufficiently low viscosity to permit its ready solution in alcohol, and when dissolved to form a 55–59% solution in denatured alcohol, the resultant product is eminently satisfactory as a varnish resin.

EXAMPLE 10

The charging material to the process is composed of a mixture having the following composition:

| | Pounds per hour |
|---|---|
| Phenol | 800 |
| 37% formaldehyde | 576 |
| 29.8% $H_2SO_4$ | 13.5 |
| Total | 1,389 |

Feed stock is continuously pumped at a pressure of 35 to 50 pounds gauge through an elongated coil of stainless steel tubing of 1 inch outside diameter, 16 gauge thick and 960 feet long, immersed in a shell containing boiling water. Reaction products leave the tubular coil at a temperature of 102° C. and enter a separator tank of about 500 gallons' capacity. In the separator tank the reaction products divide into two layers having the following approximate compositions:

| | Upper aqueous layer, pounds per hour | Lower resinous layer pounds per hour |
|---|---|---|
| Water | 257 | 243 |
| Formaldehyde | 12 | 0.1 |
| Phenol | 8 | 59 |
| $H_2SO_4$ | 3.7 | 0.3 |
| Resin | 0 | 789 |
| Total | 281 | 1,091 |

The upper aqueous layer is sent as waste to the sewer. The lower layer of resinous material is then pumped through a heating coil composed of 1½-inch stainless steel pipe, 280 feet long, surrounded by a steel pipe jacket to which steam at 180 pounds' pressure is applied. The resinous layer enters the second coil at a pressure of 25 pounds' gauge and discharges from the coil at a temperature of 160° C. and at atmospheric pressure. The reaction mass at the outlet of the dehydrator is a frothy mixture of liquid and vapor which, upon discharge into a vapor separator, approximately 5 feet high and 2.5 feet in diameter, settles into a lower layer of dehydrated resinous material, above which separated gases and vapors are released through a stack, equipped with condenser, to the atmosphere. In order to minimize radiation losses, the vapor separator is surrounded with steam jacket into which steam at about 120 pounds' gauge is introduced. The compositions of the condensate and vent gases are approximately as follows:

| | Vent gas, pounds per hour | Condensate, pounds per hour |
|---|---|---|
| Water | 205 | 30 |
| Formaldehyde | 0 | 0.1 |
| Phenol | 8.4 | 26 |
| Total | 213 | 56 |

The dehydrated resinous material is withdrawn continuously and flaked by flowing the resin on a water-cooled cylinder and scraping the film of solid resin from the cylinder. The final resin product has the following composition:

| | Pounds per hour |
|---|---|
| Water | 8 |
| Phenol | 25 |
| $H_2SO_4$ | 0.3 |
| Resin | 789 |
| Total | 822 |

Since the water layer discharged to the sewer contains a relatively large amount of formaldehyde, while the condensate from the vapor separator consists largely of phenol, if desired this condensate may be recycled to the resinification operation; it is conveniently added to the liquid-liquid separator.

Although certain preferred embodiments of the invention have been disclosed for purpose of illustration it will be evident that various changes and modifications may be made therein without departing from the scope and spirit of the invention.

We claim:

1. A process for the production of synthetic resins resulting from the reaction of resin-forming substances selected from the group consisting of a phenol, urea and melamine with an aldehyde induced by heat and the presence of a catalyst which comprises continuously passing the resin-forming substances in the presence of a catalyst in a flowing stream through a first elongated passageway of restricted cross-sectional area, maintaining the flowing stream of materials during its passage through the first elongated passageway at an elevated temperature for sufficient length of time to effect partial conversion of the resin-forming substances, cooling the effluent to a temperature at which separation into a liquid aqueous layer and a layer of incompletely converted resinous material occurs, withdrawing a portion of the liquid aqueous layer, passing the incompletely converted resinous material in a flowing stream through a second elongated passageway of restricted cross-sectional area, maintaining the flowing stream of materials during its passage through the second elongated passageway at an elevated temperature for a sufficient length of time to effect further conversion of the incompletely converted resinous material, regulating the extent of the conversion reaction by the introduction of controlled amounts of catalyst into the incompletely converted resinous material undergoing further conversion in the second elongated passageway, continuously discharging the resinous material from the second elongated passageway, and dehydrating said resinous material.

2. A process for the production of synthetic resins resulting from the reaction of resin-forming substances selected from the group consisting of a phenol, urea and melamine with an aldehyde; induced by heat and the presence of a catalyst which comprises continuously passing the resin-forming substances in the presence of a catalyst through a first reaction zone, maintaining the resin-forming substances during their passage through the first zone at an elevated temperature for sufficient length of time to effect partial conversion of the resin-forming substances, cooling the effluent from the first reaction zone to a temperature at which separation into a liquid aqueous layer containing residual catalyst and a layer of incompletely converted resinous material occurs, withdrawing a portion of the liquid aqueous layer containing residual catalyst, passing the incompletely converted resinous material through a second reaction zone, maintaining the incompletely converted resinous material during its passage through the second zone at an elevated temperature for a sufficient length of time to effect further conversion of the incompletely converted resinous material into the desired resinous product, introducing regulated amounts of the liquid aqueous layer containing residual catalyst into the incompletely converted resinous material undergoing further conversion in the second reaction zone, continuously discharging the resinous material from the second zone and dehydrating said resinous material.

3. A process for the production of synthetic resins resulting from the reaction of monomeric substances selected from the group consisting of a phenol, urea and melamine with an aldehyde induced by heat and the presence of a catalyst which comprises continuously passing the monomeric substances in the presence of a catalyst through a first heating coil, maintaining the monomeric substances during its passage through the first heating coil at an elevated temperature for sufficient length of time to effect partial conversion of the monomeric substances, cooling the effluent from the first heating coil to a temperature at which separation into a liquid aqueous layer containing residual catalyst and a layer of incompletely converted resinous material occurs, withdrawing a portion of the liquid aqueous layer containing residual catalyst, passing the incompletely converted resinous material through a second heating coil, maintaining the incompletely converted resinous material during its passage through the second heating coil at an elevated temperature for a sufficient length of time to effect substantial completion of the conversion of the incompletely converted resinous material into the desired resinous product, introducing a portion of the liquid aqueous layer containing residual catalyst into the incompletely converted resinous material undergoing further conversion in the second heating coil, continuously discharging the resinous material from the second heating coil and dehydrating said resinous material.

4. A process for the production and dehydration of synthetic resins resulting from the reaction of monomeric substances selected from the group consisting of a phenol, urea and melamine with an aldehyde in aqueous solution induced by heat and the presence of catalyst which comprises subjecting the mixture of monomeric substances, catalyst and water, to the action of heat to effect partial condensation of the monomeric substances, cooling the reaction mixture to a temperature at which separation into a liquid aqueous layer containing residual catalyst and a layer of incompletely converted resinous material occurs, discharging a portion of the separated aqueous liquid layer containing residual catalyst, passing the incompletely converted resinous material together with another portion of liquid aqueous layer containing residual catalyst through a heating coil wherein further conversion to produce the desired resinous material is substantially completed and wherein the polymeric substances containing water are elevated to a temperature sufficiently high at the coil discharge end to effect vaporization of water in the reaction mass, discharging the effluent of vapors and liquid from the heating coil into an enlarged vessel maintained at substantially isothermal conditions wherein synthetic resin in liquid state separates from the vapors, continuously removing the vapors from the enlarged vessel and continuously discharging the synthetic resin in liquid state from the enlarged vessel at a rate sufficient to prevent any substantial accumulation of liquid therein thereby minimizing further reaction of the resin.

5. A process for the production and dehydration of synthetic resins resulting from the reaction of resin-forming substances selected from the group consisting of a phenol, urea and melamine with an aldehyde which comprises subjecting the resin-forming substances to the action of heat to effect partial condensation of the resin-forming substances and concomitantly produce water, cooling the reaction mass to a temperature at which separation into a liquid aqueous layer and a layer of incompletely converted resinous material occurs, withdrawing a portion of the liquid aqueous layer, passing the incompletely converted resinous material through a heating coil wherein condensation to produce the desired resinous material is substantially completed, discharging the reaction mass into an enlarged vessel to effect separation of vapors from the resin in liquid state, and continuously discharging the synthetic resin in liquid state from the enlarged vessel at a rate sufficient to prevent any substantial accumulation of liquid therein thereby minimizing further reaction of the resin.

6. A process for the production and dehydration of synthetic resins resulting from the reaction of monomeric substances selected from the group consisting of a phenol, urea and melamine with an aldehyde which comprises subjecting the monomeric substances to the action of heat to effect 50% to 90% of the condensation reaction of the monomeric substances and concomitantly produce water, passing the partially condensed polymeric substances containing water through a heating coil wherein condensation to produce the desired resinous material is substantially completed and wherein the polymeric substances containing water are elevated to a temperature sufficiently high at the coil discharge end to effect vaporization of water in the reaction mass, discharging the reaction mass of vapors and liquid into an enlarged vessel maintained under substantially isothermal conditions wherein the synthetic resin separates from the vapors, continuously removing the vapors from the enlarged vessel and continuously discharging the separated synthetic resin in liquid state from the enlarged vessel.

7. A process for the production and dehydration of synthetic resins resulting from the reaction of monomeric substances selected from the group consisting of a phenol, urea and melamine with an aldehyde induced by heat and the presence of a catalyst which comprises subjecting the mixture of monomeric substances and catalyst to the action of heat in a first stage to effect partial conversion of the monomeric substances, cooling the reaction mass from the first stage to a temperature at which separation into a liquid aqueous layer containing residual catalyst and a layer of incompletely converted resinous material occurs, withdrawing a portion of the liquid aqueous layer containing residual catalyst, subjecting the partially converted polymeric substances to the action of heat in a second stage to substantially complete conversion of the partially converted substances into the desired resinous product, regulating the extent of the conversion reaction in the second stage by the introduction of controlled amounts of solution containing residual catalyst into the incompletely converted resinous material undergoing further conversion in the second stage, and dehydrating the resinous material from the second stage.

8. A process for the production of phenoplasts which comprises continuously passing a mixture of a phenol, an aqueous formaldehyde solution and an acid catalyst through a first heating coil, maintaining the mixture during its passage through the first heating coil at an elevated temperature for sufficient length of time to effect partial conversion of the phenol and formaldehyde, cooling the effluent from the first heating coil to a temperature at which separation into a liquid aqueous layer containing residual catalyst and a layer of incompletely converted resinous material occurs, withdrawing a portion of the liquid aqueous layer containing residual catalyst, passing the incompletely converted resinous material through a second heating coil, maintaining the incompletely converted resinous material during its passage through the second heating coil at an elevated temperature for a sufficient length of time to effect substantial completion of the conversion of the incompletely converted resinous material into the desired resinous product, introducing a portion of the liquid aqueous layer containing residual catalyst into the incompletely converted resinous material undergoing further conversion in the second heating coil, continuously discharging the effluent from the second heating coil into an enlarged chamber maintained at substantially isothermal conditions wherein a resin in liquid state separates from the vapors, continuously removing the vapors from the enlarged chamber and continuously discharging the resin in liquid state from the enlarged chamber at a rate sufficient to prevent any substantial accumulation of liquid therein thereby minimizing further reaction of the resin.

9. A process for the production of tar acid-aldehyde resins which comprises continuously passing a mixture of tar acid, an aldehyde and a catalyst through a first heating coil, maintaining the mixture during its passage through the first heating coil at an elevated temperature for sufficient length of time to effect partial conversion of the tar acid and aldehyde, cooling the effluent from the first heating coil to a temperature at which separation into a liquid aqueous layer containing residual catalyst and a layer of incompletely converted resinous material occurs, withdrawing a portion of the liquid aqueous layer containing residual catalyst, passing the incompletely converted resinous material through a second heating coil, maintaining the incompletely converted resinous material during its passage through the second heating coil at an elevated temperature for a sufficient length of time to effect substantial completion of the conversion of the incompletely converted resinous material into the desired resinous product, introducing a portion of the liquid aqueous layer containing residual catalyst into the incompletely converted resinous material undergoing further conversion in the second heating coil, continuously discharging the effluent from the second heating coil into an enlarged chamber maintained at substantially isothermal conditions wherein a liquid resin separates from the vapors, continuously removing the vapors from the enlarged chamber and continuously discharging the liquid resin from the enlarged chamber at a rate sufficient to prevent any substantial accumulation of liquid therein thereby minimizing further reaction of the resin.

10. A process for the production and dehydration of synthetic resins resulting from the reaction of a phenol with an aldehyde which comprises subjecting a mixture of a phenol and an aldehyde to the action of heat to effect 50% to 90% of the condensation reaction of the phenol with the aldehyde and concomitantly produce water, passing the partially condensed polymeric substances containing water through a heating coil wherein condensation to produce the desired resinous material is substantially completed and wherein the polymeric substances containing water are elevated to a temperature sufficiently high at the coil discharge end to effect vaporization of water in the reaction mass, discharging the reaction mass of vapors and liquid into an enlarged vessel maintained under substantially isothermal conditions wherein the synthetic resin separates from the vapors, continuously removing the vapors from the enlarged vessel and continuously discharging the separated synthetic resin in liquid state from the enlarged vessel.

GORDON A. COLEMAN.
RICHARD B. GREENE.
JOHN H. MERRIAM.
STUART P. MILLER.
ROBERT F. SHANNON.

References Cited in the file of this patent

UNITED STATES PATENTS

| Number | Name | Date |
|---|---|---|
| 1,660,403 | Turkington | Feb. 28, 1928 |
| 1,665,235 | Trickey | Apr. 10, 1928 |
| 2,058,475 | Loos | Oct. 27, 1936 |
| 2,456,192 | Houlton | Dec. 14, 1948 |
| 2,467,769 | Morrow | Apr. 19, 1949 |